United States Patent [19]

Wuppermann et al.

[11] Patent Number: 5,737,367
[45] Date of Patent: Apr. 7, 1998

[54] TRANSMISSION SYSTEM WITH SIMPLIFIED SOURCE CODING

[75] Inventors: Friedhelm Wuppermann; Franciscus M. J. De Bont, both of Eindhoven, Netherlands

[73] Assignee: U.S. Philips Corporation, New York, N.Y.

[21] Appl. No.: 319,900

[22] Filed: Oct. 7, 1994

[30] Foreign Application Priority Data

Oct. 11, 1993 [BE] Belgium ................. 09301076

[51] Int. Cl.[6] ................. H04B 14/04; H04B 1/66
[52] U.S. Cl. ................. 375/242; 375/240
[58] Field of Search ................. 375/240, 242, 375/244; 381/29, 30, 36; 341/143; 395/2.12, 2.91, 2.21

[56] References Cited

U.S. PATENT DOCUMENTS

| | | | |
|---|---|---|---|
| 3,621,397 | 11/1971 | Murotani | 375/242 |
| 3,715,512 | 2/1973 | Kelly | 395/2.28 |
| 4,216,354 | 8/1980 | Esteban et al. | 395/2.38 |
| 4,569,075 | 2/1986 | Nussbaumer | 395/2.12 |
| 4,677,671 | 6/1987 | Galand et al. | 375/240 |
| 4,979,188 | 12/1990 | Kotzin et al. | 375/254 |
| 5,150,387 | 9/1992 | Yoshikawa et al. | 375/240 |
| 5,384,793 | 1/1995 | Zinser | 371/69.1 |
| 5,490,170 | 2/1996 | Akagiri et al. | 375/240 |

OTHER PUBLICATIONS

CITT Recommendation G. 728 "Coding of speech at 16 kbit/x using low delay code excited linear prediction".

"Bit Rates in Audio Source Coding" by R.N.J. Veldhuis in IEEE Journal on Selected Areas in Communications, vol. 10, No. 1, Jan. 1992.

"Predictive Coding of Speech at Low Bit Rates" by B.S. Atal in IEEE Transactions on Communications, vol. COM–30, No. 4, Apr. 1984.

"Information technology—Coding of moving pictures and associated audio for digital storage media up to about 1.5 Mbit/s", section 3, pp. 174–337.

*Primary Examiner*—Tesfaldet Bocure
*Attorney, Agent, or Firm*—Leroy Eason

[57] ABSTRACT

An audio signal digital transmission system wherein the signal is sampled and successive segments each of N samples are digitally encoded. Encoding has heretofore been effected by vector quantization, whereby a memory stores a book of a large number of codewords corresponding to possible segments of successive signal samples, and the best matching stored segment is determined by calculation. The present invention bases encoding on comparison of the envelope of a signal segment with a limited number of reference envelopes. The best matching reference envelope is selected, and an identifying codeword therefore is transmitted along with related parameters. A receiver reproduces the signal from the reference envelope and the related parameters. Since identified envelopes of the signal segments are less variable and simpler to evaluate than the signal samples in the segments, a considerable reduction of memory capacity and calculation complexity is achieved.

6 Claims, 7 Drawing Sheets

TRANSMISSION SYSTEM WITH SIMPLIFIED SOURCE CODING

BACKGROUND OF THE INVENTION

The invention relates to a transmission system comprising a transmitter which has a coder for deriving a digitally coded signal from a transmit signal, the transmitter comprising transmitting means for transmitting the coded signal by a channel to a receiver, which receiver comprises a decoder for forming a reconstructed signal from the coded signal.

The invention likewise relates to a transmitter, a receiver, a coder and a decoder to be used in such a system.

A transmission system as defined in the opening paragraph is known from the journal article "Bit Rates in Audio Source Coding" by R. N. J. Veldhuis in IEEE Journal on Selected Areas in Communications, Vol. 10, No. 1, January 1992.

Transmission systems of this type are used for digitally transmitting an analog signal by a digital transmission channel or for recording and reproducing such a signal by a magnetic or optical storage medium. For transmission or recording purposes, the analog signal is to be converted to a digital signal. It appears that the conversion of an analog signal to a digital signal having sufficient resolution by a digitizer, without further measures being taken, often results in a digital signal that needs an impermissibly high transmission rate. Several coders are known for reducing this transmission rate.

In a first type of transmission system the relation between successive samples of the digitized analog signal is determined in the coder by means of linear prediction, and a transmit signal to be coded is derived from the digitized analog signal by an analysis filter. This transmit signal, also referenced a residual signal, is a measure of a component of a signal sample that cannot be predicted on the basis of preceding signal samples. The relation between successive signal samples is characterized by so-termed prediction parameters. The transmit signal is coded and transmitted with the prediction parameters in the form of a digitally coded signal to the receiver through the channel. As the transmit signal is formed only by unpredictable components of the original signal, it has a much lower amplitude than the original signal. As a result, it can be coded with much fewer digital symbols.

In the decoder a reconstructed signal is derived from the digitally coded signal. A synthesis filter having a transfer function which is inverse to the transfer function of the analysis filter derives a reconstructed signal which is a replica of the original input signal to the transmitter.

In a second type of transmission system, known from the above journal article, an input signal to the coder is split up into a number of frequency sub-bands by means of sub-band filters whose output signals are the transmit signals. By utilizing psychoacoustic properties of the human auditory system, sub-band signals lying close to much more powerful sub-band signals can be coded with much fewer bits than the much more powerful sub-band signal. The transmitter transmits the transmit signals, after being converted to coded signals by the coder, through the channel to the receiver. In the receiver reconstructed signals are formed from the coded signals, which reconstructed signals are combined to form a replica of the analog signal. In the prior-art transmission system the transmit signals are coded by means of vector quantization if a maximum reduction of the necessary transmission rate is desired. With vector quantization a segment formed by a number of successive samples of the transmit signal is compared with a (large) number of code words from a so-called codebook. From these code words is selected the code word that leads to a minimum difference measure between the segment of successive signal samples of the transmit signal and the relevant code word. The index of the relevant code word is then transmitted to the receiver where the code word is sought by means of a similar codebook to the one in the receiver and is used as an approximate value for the segment of the transmit signal. Vector quantization generally necessitates a codebook with a large number of code words, which necessitates a large codebook memory. In addition, the search process for the best code word necessitates considerable calculation capacity.

SUMMARY OF THE INVENTION

It is an object of the invention to provide a transmission system as defined in the opening paragraph, in which the necessary memory capacity and the necessary calculation capacity are reduced considerably.

For this purpose, the invention is characterized in that the coder comprises envelope determining means for determining the envelope of the transmit signal, and selecting means for selecting a reference envelope from a number of reference envelopes such that the value of the difference between a segment of the envelope of the transmit signal and the selected reference envelope is minimized. The digitally coded signal contains an identification code of the selected reference envelope, and the decoder comprises reconstruction means for deriving a reconstructed signal which has an envelope that depends on the reference envelope belonging to the identification code.

The invention is based on the recognition that the envelope of a segment of samples of the transmit signal presents considerably fewer variations than the segment of samples itself. This means that a number of reference envelopes that may be considerably smaller than the number of code words in vector quantization may suffice. This leads to a reduction of the necessary memory capacity. In addition, the necessary calculation capacity is reduced because the number of comparisons to be made is also reduced.

There is observed that the implementation of the invention is not restricted to coders utilizing linear prediction, sub-band coding or transform coding.

An embodiment of the invention is characterized in that the coder comprises sign determining means for determining the sign of the transmit signal, the transmitting means being arranged for transmitting the sign of the transmit signal through the channel to the receiver and the reconstructing means being arranged for utilizing the sign of the transmit signal when the reconstructed signal is reconstructed from the digitally coded signal.

An accurate coding of the transmit signal is possible by transmitting to the receiver the sign of the transmit signal in addition to an identification code of a reference envelope. The reconstructing means may form the reconstructed signal from the reference envelope and the received signs of successive samples in the segment of the transmit signal. This may be effected by multiplying the value of the envelope by +1 or −1 respectively, in response to the received sign. An alternative embodiment of the invention is characterized, in that the decoder comprises a noise source for generating a noise signal, and in that the reconstructing means are likewise arranged for utilizing the noise signal when the reconstructed signal is formed from the digitally coded signal.

By utilizing a noise source, present in the decoder, for deriving the reconstructed signal from the received reference envelope, only the identification code of the reference envelope need be transmitted through the channel. Experiments have shown that the perceptive quality of high-frequency audio signals coded in this manner is acceptable.

A further embodiment of the invention is characterized, in that the coder comprises transforming means for deriving the transmit signal from an input signal, and the decoder comprises inverse transforming means for deriving a reconstructed input signal from the reconstructed signal.

The reference envelope may have a constant power, in which case value a power measure of the signal to be encoded is determined, the power measure is transmitted to the receiver, and a reconstructed signal having a power proportional to the power measure is formed. As a result, the number of necessary reference envelopes is smaller than in the case where the reference envelope not only is to have different forms but also different power values.

BRIEF DESCRIPTION OF THE DRAWINGS

The invention will be further explained with reference to the drawing in which:

FIGS. 8a–8m are graphic representations of reference envelopes such as can be used in the coder and decoder shown in FIGS. 2 and 4, which envelopes are each represented by eight values.

DESCRIPTION OF THE PREFERRED EMBODIMENTS

Figure 1A:
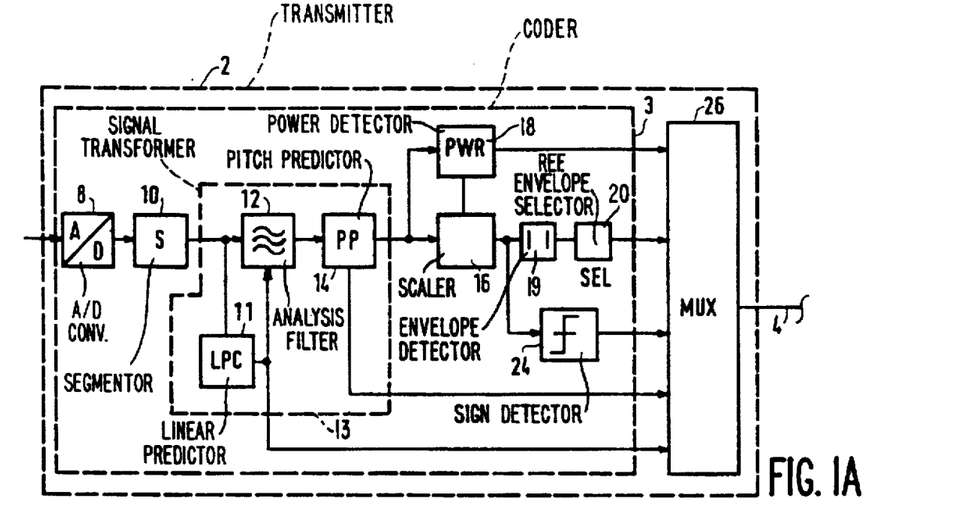
FIG. 1A and FIG. 1B show the transmitter and receiver of a first transmission system according to the invention.

In the transmission system shown in FIG. 1A an input signal is applied to a transmitter 2. Inside the transmitter 2 the input signal is applied to an input of a coder 3. The input of the coder 3 is connected to a digitizer 8. The output of the digitizer 8 is connected to an input of a segmenting means 10. The output of the segmenting means 10 is connected to an input of transforming means 13 in this case formed by a cascade combination of an analysis filter 12 and pitch prediction means 14. The output of the segmenting means 10 is additionally connected to an input of linear prediction means 11. An output of the linear prediction means 11, which carries prediction parameters for its output signals, is connected to a control input of the analysis filter 12 and to a first input of transmitting means in this case formed by a multiplexer 26. An output of the pitch prediction means 14, which carries pitch prediction parameters for its output signals, is connected to a second input of the multiplexer 26.

An output of the transforming means 13, which carries the transmit signal for its input signal, is connected to an output of power measuring means 18 and to an input of scaling means 16. A first output of the measuring means 18 is connected to a control input of the scaling means 16. A second output of the power measuring means 18, which carries a power measure for output signal, is connected to a third input of the multiplexer 26. The output of the scaling means 16 is connected to an input of the envelope determining means 19 and to an input of sign determining means 24. The output of the envelope determining means 19 is connected to an input of the selecting means 20. The output of the selecting means 20, which carries the identification code of the selected reference envelope for its output signal, is connected to a fourth input of the multiplexer 26, whereas the output of the sign determining means 24, which carries the sign of the transmit signal for its output signal, is connected to a fifth input of the multiplexer 26.

Figure 1B:
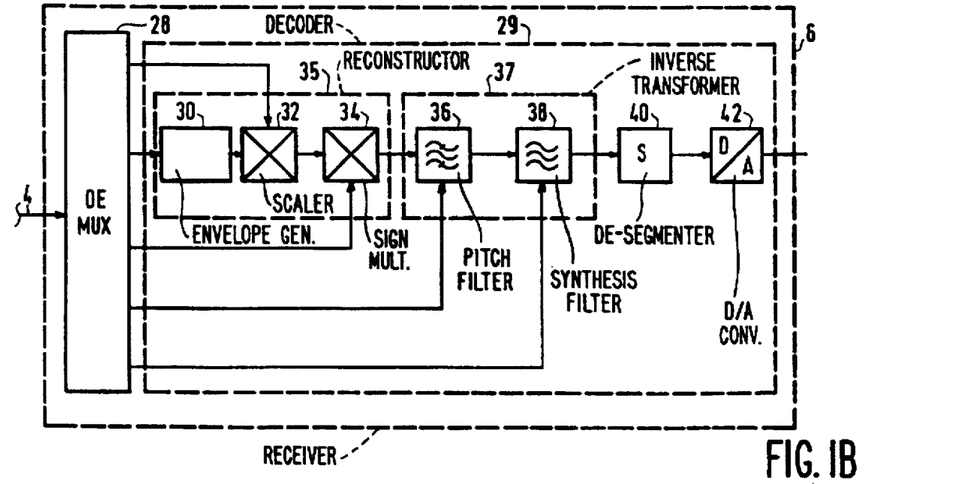

The output of the multiplexer 26 also forms the output of the transmitter 2. The output of the transmitter 2 is connected, by channel 4, to an input of the receiver 6. The input of the receiver 6 is connected to an input of a demultiplexer 28. The outputs of the demultiplexer 28 are connected to inputs of a decoder 29. A first output of the demultiplexer 28, which carries the linear prediction parameters for its output signals, is connected to a first control input of inverse transforming means 37. In the inverse transforming means 37 this first control input is connected to a control input of a synthesis filter 38. A second output of the demultiplexer 28 is connected to a second control input of the inverse transforming means 37. In the inverse transforming means 37 this second control input is connected to a pitch introduction filter 36. A third output of the demultiplexer 28, which carries the power measure for its output signal, is connected to a control input of scaling means 32. A fourth output of the demultiplexer 28, which carries the identification code of the selected reference envelope for its output signal, is connected to an input of an envelope generator 30. The output of the envelope generator 30 is connected to an input of the scaling means 32. An output of the scaling means 32 is connected to an input of a multiplier circuit 34. The reconstructing means 35 are formed by the combination of the envelope generator 30, the scaling means 32 and the multiplier circuit 34.

The output of the multiplier circuit 34 is connected to an input of the inverse transforming means 37 which input is formed by an input of the pitch introduction filter 36. The output of the pitch introduction filter 36 is connected to an input of the synthesis filter 38. The output of the synthesis filter 38, likewise forming the output of the inverse transforming means 37, is connected to an input of the desegmenting means 40 whose output is connected to an input of a digital-to-analog converter 42. The output of the digital-to-analog converter 42 likewise forms the output of the decoder 29 and of the receiver 6.

The input signal of the transmission system shown in FIG. 1 is digitized by the digitizer 8. The output signal of the digitizer 8 is converted by segmenting means 10 to successive segments of N signal samples which are available in parallel on the output of the segmenting means 10. The transforming means 13 transform the output signal of the segmenting means 10 into the transmit signal which is available in the form of successive segments of N signal samples. In the linear prediction means 11 the linear prediction parameters of the relevant segment of the input signal is determined. The analysis filter 12 determines the residual signal in segmented form in response to the prediction parameters determined by the prediction means 11. The pitch prediction means 14 determine the pitch prediction parameters of a periodic component available in the prediction residual. These parameters may be, for example, a pitch period and an amplitude factor. In addition, the periodic component is removed from the output signal of the analysis filter 12 by the pitch prediction means 14. The operation of the transforming means 13 formed by linear prediction means 12 and pitch prediction means 14 is described, for example, in the journal article "Predictive Coding of Speech at Low Bit Rates" by B. S. Atal in IEEE Transactions on Communications, Vol. COM-30, No. 4, April 1984.

A power measure of the transmit signal is determined by power measuring means 18. A suitable power measure P is equal to $$P = \sum_{i=1}^{N} x_i^2$$

where i is a running variable and $x_i$ is the value of the $i^{th}$ sample of N samples of a specific segment of the transmit signal. A control signal inversely proportional to the power measure is supplied to the scaling means 16 by the power measuring means 18. Scaling means 16 scale the output signal of the transforming means in such a way that the power of each segment of the signal samples on the output of the scaling means remains the same. The envelope determining means 19 determine the envelope of each segment of signal samples on the output of the scaling means 16. This may be done by determining the absolute values of all the signal samples in the relevant segment. The envelope is then given by the series of absolute values of the signal samples in the relevant segment. The selecting means 20 determines which reference envelope approaches best the relevant segment envelope determined by the envelope determining means 19. The output signal of the selecting means 20 consists of the identification code of the selected reference envelope. The sign determining means 24 determine the signs of all the samples in the transmit signal in a segment. The output signal of the sign determining means 24 is formed by a series of signs of the samples of the transmit signal.

The output signals of the linear prediction means 11, the pitch prediction means 14, the sign determining means 24, the selecting means 20 and the power measuring means 18 are combined by the multiplexer 26 into a single signal which is transmitted to the receiver 6 via channel 4. In the receiver 6 the received signal is subdivided into a number of sub-signals by the demultiplexer 28. By means of the identification code of the selected reference envelope the envelope generator 30 generates the selected reference envelope in the form of a segment of samples of the relevant reference envelope. The scaling means 32 scale the reference envelope in response to the received power measure so that this reference envelope has a power that is proportional to the received power measure. Sign multiplier circuit 34 multiplies each of the values of the samples in the reference envelope by the appropriate sign from the series of received signs available on the output of the demultiplexer 28. The output signal of the sign multiplier circuit 34, being a reconstruction of the transmitter signal, is transformed into a reconstructed input signal by means of the inverse transforming means 37. For this purpose the synthesis filter 38 and the pitch introduction filter 36 receive the relevant linear prediction parameters and pitch prediction parameters. The operation of the pitch introduction filter 36 and the synthesis filter 38 are known from said journal article by B. S. Atal. The transfer function of the synthesis filter 38 is inverse to the transfer function of the analysis filter 12. The reconstructed transmitter input signal, available in segmented form, is then convened to a series of successive signal samples by the desegmenting means 40. The digital-to-analog converter 42 converts the output signal of the desegmenting means 40 to an analog signal.

Figure 2A:
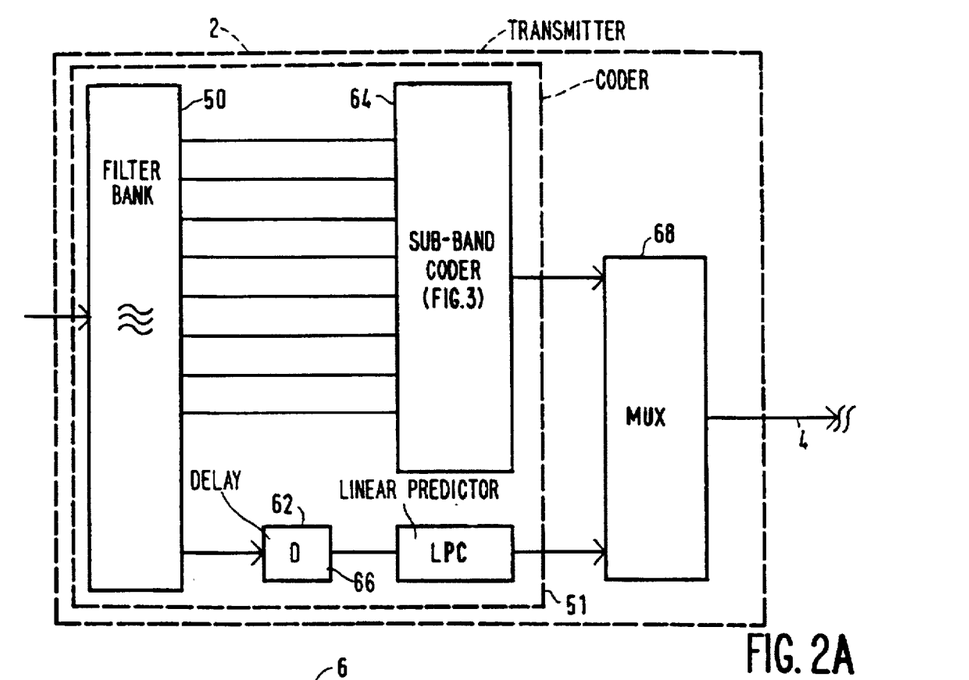
FIG. 2A and FIG. 2B show the transmitter and receiver of a second transmission system according to the invention.
Figure 2B:
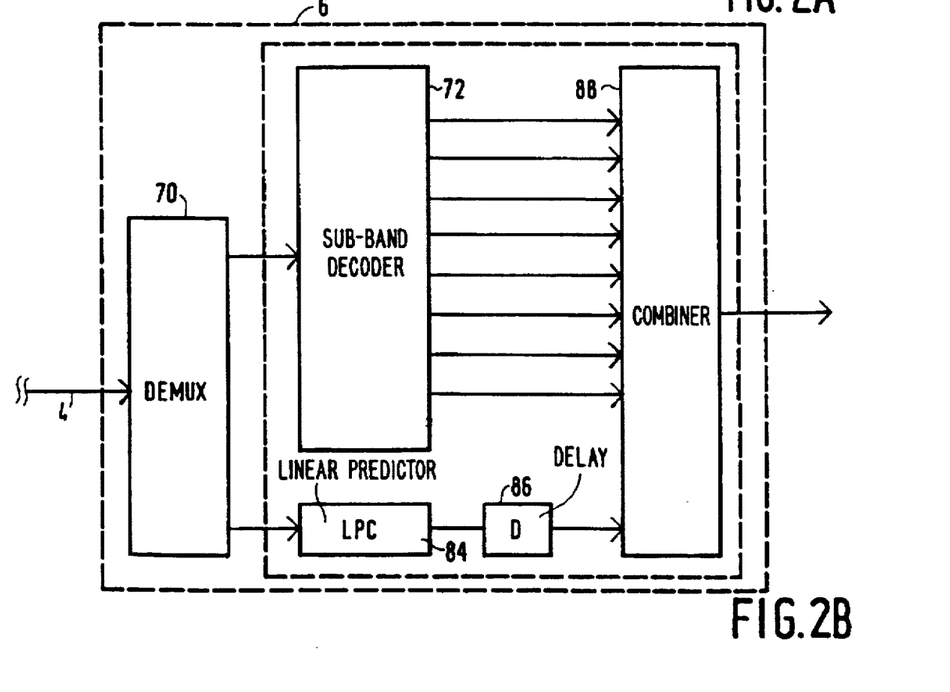

The transmission system shown in FIGS. 2A and 2B differs from that in FIGS. 1A and 1B in that it employs sub-band coding. In FIG. 2A the input signal is applied to a transmitter 2. The input of the transmitter 2 is connected to an input of transforming means present in the coder 51, which transforming means are formed here by a filter bank 50. A first output of the filter bank 50 is connected to an input of a delay element 62. The output signal on the first output of the filter bank 50 represents a first spectral portion of the input signal. An output of the delay element 62 is connected to an input of a time-domain coder in this case formed by a vector quantizer 66 which utilizes linear prediction coding (LPC). An output of the vector quantizer 66, which carries a first digital output signal, is connected to a first input of the transmitter means formed here by a multiplexer 68.

A number of outputs of the filter bank 50, which carry transmit signals for their output signals, are connected each to an input of a transform-domain coder in this case formed by a sub-band coder 64. The transmit signals on the input of the sub-band coder 64 collectively represent a second spectral portion of the input signal. An output of the sub-band coder 64, which carries a second digital output signal, is connected to a second input of the multiplexer 68.

The output of the multiplexer 68 is connected, via channel 4, to an input of a receiver 6. In the receiver 6 the signal is applied to an input of a demultiplexer 70. A first output of the demultiplexer 70, which carries the first digitally coded signal for its output signal, is connected to a time-domain decoder in this case formed by an inverse vector quantizer 84 which utilizes linear prediction coding. An output of the inverse vector quantizer 84, which carries a first reconstructed signal for its output signal, is connected to an input of a delay element 86. The output of the delay element 86 is connected to a first input of the combining means 88. A second output of the demultiplexer 70 is connected to an input of the transform domain decoder in this case being a sub-band decoder 72. A number of outputs of the sub-band decoder 72, which carry reconstructed signals for their output signals, which reconstructed signals represent the second spectral portion of the input signal, are connected each to an input of the combining means 88. On the output of the combining means 88 the reconstructed input signal is available.

The input signal of the transmission system shown in FIG. 2A is split up by the filter bank 50 into a first spectral portion and a second spectral portion. The first spectral portion is converted to a first digitally coded signal by means of a vector quantizer 66. A suitable implementation of the vector quantizer 66 is described, for example, in CCITT Recommendation G.728 "Coding of speech at 16 kbit/s using low delay code excited linear prediction". This coder is based on the principle of "analysis by synthesis".

In this vector quantizer the input signal to be coded is transformed into successive segments of a number of signal samples of the signal to be coded. For a large number of words stored in a codebook a synthesized signal segment is generated by means of a synthesis filter. The difference between the current segment of the input signal and the synthesized signal segment is filtered by means of a perceptual weighting filter. The squared sum of the signal samples is calculated from a segment of output signal samples of the perceptual weighting filter.

For each of the available 1024 codebook words the synthesized signal is generated, the difference between the input signal and the synthesized signal is determined, the synthesis signal is weighted with the perceptive weighting filter and the squared sum is calculated. From these codebook words is selected the codebook word that gives rise to the least square sum.

The transfer function of the analysis filter is determined by linear prediction by means of an estimate of the relation between successive signal samples in the four synthesized signal segments preceding the current segment. The coded signal now consists of a codebook index of the selected codebook word. There should be observed that the prediction parameters need not be transmitted.

The second spectral portion of the input signal is represented by the transmit signals in the form of sub-band signals on the output of the filter bank 50. Each of these sub-band signals is converted by the sub-band coder 64 to an associated digitally coded signal. The second digitally coded output signal is formed by a combination of the digitally coded signals. There should be observed that the sub-band signals on the output of the filter bank 50 are baseband signals representing a bandpass filter in that particular sub-band. This baseband representation is advantageous in that the number of samples needed is determined per sub-band by the bandwidth of that particular sub-band and not by the maximum frequency in that particular sub-band. A suitable implementation of the sub-band coder 64 for signals having a sampling rate of 48 kHz is known from Draft International Standard ISO/IEC DIS 11172 "Information technology—Coding of moving pictures and associated audio for digital storage media up to about 1.5 Mbits", section 3, pp. 174–337. The sub-band signals on the input are converted to a digital signal by means of a quantization and a coding. The sub-band signals are quantized with a number of levels which number may be different for different sub-bands. The current number of quantization levels used for each sub-band depends on the power of the particular sub-band signal and the power of the sub-band signals of adjacent sub-bands. The property of the human auditory system is then made use of that a weak signal in the vicinity of a strong signal is inaudible. As a result, it is possible to quantize such a weak signal with considerably fewer quantization levels than the strong signal. Based upon the power of the various sub-band signals, a just audible noise level is calculated for each sub-band. From this noise level the number of necessary quantization levels is determined for each sub-band signal. The second digital output signal now consists of two different quantized sub-band signals and of information about the number of quantization levels of each sub-band. It is noted that the coder described above is arranged for coding a 0-24 kHz signal. Seeing that a first spectral portion is coded by the time-domain coder, the sub-bands lying in this spectral area need not be coded. This may simply be effected by not allocating any bits to these sub-bands.

The multiplexer 68 combines the first and second digitally coded output signals to a single combined signal. The delay element 62 is present for equalizing the delay of the spectral portions of the input signal which reach the multiplexer 68 along two paths. This combined signal is transmitted to the receiver 6 by the transmitter 2 through the channel 4. In the receiver 6 the combined signal is split up into a replica of the first digitally coded output signal and a replica of the second digitally coded output signal. The replica of the first digitally coded output signal is converted by the inverse vector quantizer 84 to a first reconstructed signal. A suitable implementation of the sub-decoder is described in aforementioned CCITT Recommendation G.728. In this inverse vector quantizer 84 the codebook word selected by the vector quantizer 66 is generated in response to the transmitted codebook index. By means of a synthesis filter the codebook word is converted to a decoded signal. The parameters of the synthesis filter are derived by linear prediction from the four segments preceding the current segment of the decoded signal. This is effected in similar manner to that in coder 66.

The replica of the second digitally coded output signal is converted by the sub-band decoder 72 to a number of reconstructed signals in the form of sub-band signals which are available on the output of the sub-band decoder 72. It is noted that these sub-band signals are baseband signals representing a bandpass signal in that particular sub-band. This baseband representation is advantageous in that the number of samples necessary for each sub-band are determined by the bandwidth of that particular sub-band and not by the maximum frequency in that particular sub-band. The combining means 88 convert the sub-band signals to the desired sub-band frequency and, subsequently, combine the sub-band signals with the first reconstructed signal to a reconstructed input signal.

Figure 3:
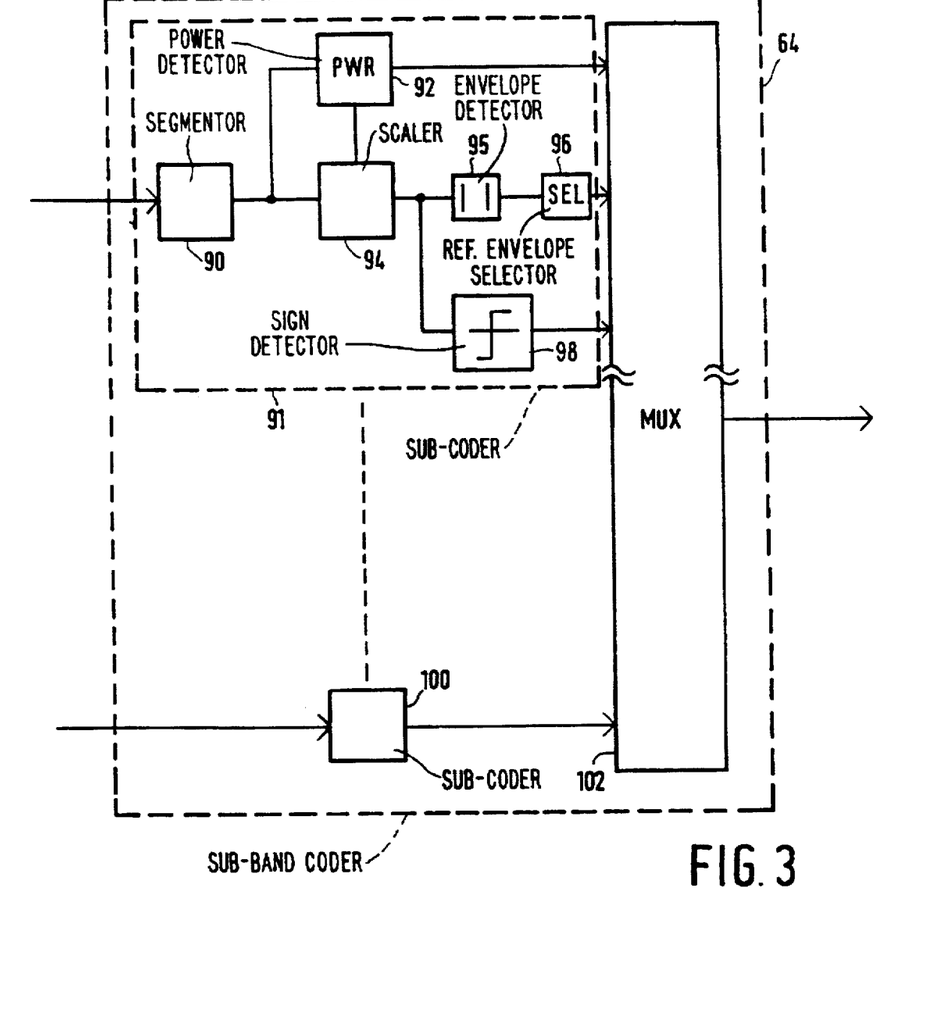
FIG. 3 shows a sub-band coder to be used in the transmission system shown in FIG. 2A.

In the sub-band coder 64 shown in FIG. 3, each of the sub-band signals is applied to its own sub-coder 91 . . . 100. The sub-coders 91 . . . 100 are arranged according to a like principle. The input of the sub-coder 91 is connected to segmenting means 90. The output of the segmenting means 90 is connected to an input of power measuring means 92 and to an input of scaling means 94. A first output of the measuring means 92 is connected to a control input of the scaling means 94. A second output of the power measuring means 92, carrying a power measure for its output signal, is connected to a first input of a multiplexer 102. The output of the scaling means 94 is connected to an input of an absolute value generator 95 and to an input of sign determining means 98. An output of the absolute value generator is connected to an input of selecting means 96. An output of the selecting means 96, carrying a coded signal in the form of an identification code of a selected reference envelope for its output signal, is connected to an input of the multiplexer 102. An output of the sign determining means is connected to a third input of the multiplexer 102. The output of the multiplexer 102 forms the output of the sub-band coder 64.

In an embodiment of the coder 51 (in FIG. 2A) intended to be used in a transmission system for audio signals having a maximum frequency of 8 kHz, the first spectral portion comprises a frequency area from 0 to 2 kHz and the second spectral portion the frequency area from 2 to 8 kHz. The second spectral area is represented by the eight sub-band signals on the input of the sub-band coder 64. In the sub-coders 91 . . . 100 the sub-band signals are segmented into equally long segments, the number of samples of the sub-band signal in a segment being proportional to the bandwidth of that particular sub-band signal. The frequency area of each sub-band and its associated number of samples per segment is shown in Table 1. The time duration of a segment is 4 mS.

TABLE 1

| sub-band i | $f_{min}$ [kHz] | $f_{max}$ [kHz] | $\Delta f$ [kHz] | samples/segment |
|---|---|---|---|---|
| 1 | 2 | 2.5 | 0.5 | 4 |
| 2 | 2.5 | 3 | 0.5 | 4 |
| 3 | 3 | 3.5 | 0.5 | 4 |
| 4 | 3.5 | 4 | 0.5 | 4 |
| 5 | 4 | 5 | 1 | 8 |
| 6 | 5 | 6 | 1 | 8 |
| 7 | 6 | 7 | 1 | 8 |
| 8 | 7 | 8 | 1 | 8 |

In an embodiment of the coder 51 intended to be used in a transmission system for audio signals having a maximum frequency of 16 kHz, the first spectral portion comprises the frequency area from 0 to 4 kHz, whilst the second spectral portion comprises the frequency area from 4 to 16 kHz. The second spectral portion is then represented by the eight sub-band signals on the input of the sub-band coder 64. In the sub-coders 91 ... 100 the sub-band signals are also segmented into equally long segments, the number of samples of the sub-band signal in a segment being proportional to the bandwidth of that particular sub-band signal. The frequency area of each sub-band and its associated number of samples per segment is shown in Table 2. The time duration of a segment is in this case 2 mS.

TABLE 2

| sub-band i | $f_{min}$ [kHz] | $f_{max}$ [kHz] | $\Delta f$ [kHz] | samples/segment |
|---|---|---|---|---|
| 1 | 4 | 5 | 1 | 4 |
| 2 | 5 | 6 | 1 | 4 |
| 3 | 6 | 7 | 1 | 4 |
| 4 | 7 | 8 | 1 | 4 |
| 5 | 8 | 10 | 2 | 8 |
| 6 | 10 | 12 | 2 | 8 |
| 7 | 12 | 14 | 2 | 8 |
| 8 | 14 | 16 | 2 | 8 |

In the sub-band coder 64 shown in FIG. 3 the power measuring means 92 determine a power measure for that particular segment of the sub-band signal samples. This power measure is converted to a logarithmic power measure and the difference between the logarithmic power measures of a current segment and its preceding segment is coded by means of Huffmann coding. The Huffmann coded signal from coder 64 is applied to a multiplexer 68 (in FIG. 2A), so that this signal is transmitted to the receiver 6. An alternative method of coding the power measure of the different sub-bands would be to code the power measure of a specific sub-band and code the difference between the powers of this particular sub-band and the other sub-bands. This leads to a considerable saving on transmission capacity in situations in which the power measures of the different sub-bands are correlated. The scaling means 94 scale the sub-band signal samples in response to a control signal coming from the power measuring means 92, so that the power of the segments on the output of the scaling means 94 has a constant value. The absolute value generator 95 determines the envelope of the output signal of the scaling means 94 and applies this envelope in segmented form to the selecting means 96. The selecting means 96 compares the envelope of the output signal of the scaling means 94 with a number of reference envelopes and select the reference envelope that corresponds most to the envelope of the output signal of the scaling means 94. The selecting means 96 supplies on its output a coded signal in the form of an identification code of the selected reference envelope. This identification code is applied to the multiplexer 102 to be sent to the receiver 6. In the sub-bands in which four sub-band signal samples are used per segment, five reference envelopes are used, whereas in the sub-bands in which eight sub-band signal samples are used per segment, eleven reference envelopes are used.

The number of reference envelopes used in the sub-bands with eight sub-band signal samples may vary from one to eleven. By implementing the Huffmann coding of the power measure the number of bits necessary for this power measure may differ from one segment to the next. If transmission capacity is left because of this, this transmission capacity may be used for transmitting longer identification codes of reference envelopes, so that a larger number of reference envelopes may be used for coding the envelope of the output signal of the scaling means 94.

The sign determining means 98 determine the sign of the output signal of the scaling means 94. This sign is applied to the third input of the multiplexer 102 for transmission to the receiver 6. It is possible that not for all the sub-bands the sign of the output signal of the scaling means 94 is transmitted to the receiver, but that in the receiver this sign is locally generated by a noise generator. This simplification has appeared to be especially permissible in the higher sub-bands.

Figure 4:
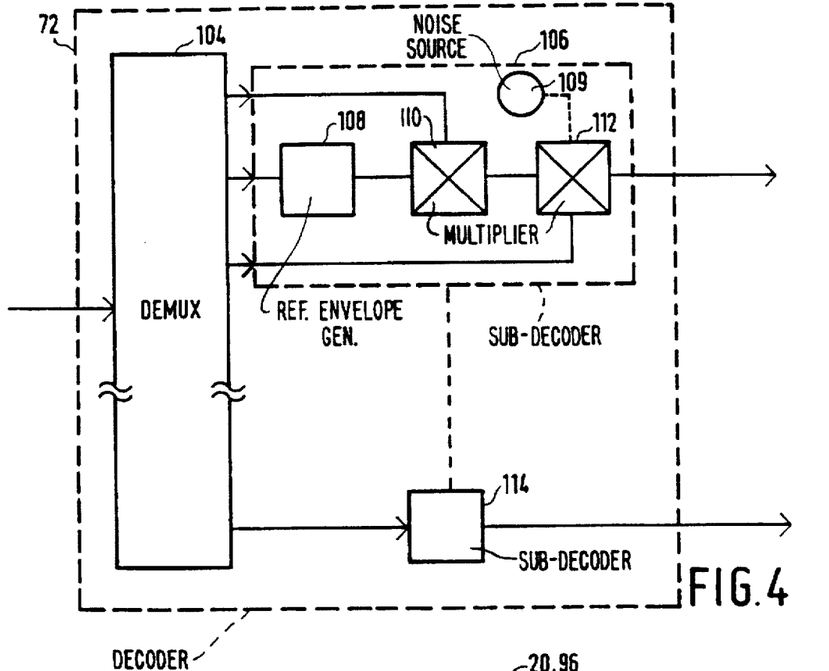
FIG. 4 shows a sub-band decoder to be used in the transmission system shown in FIG. 2A.

In the sub-band decoder 72 shown in FIG. 4 the output signal of the demultiplexer 70 (in FIG. 2B) is applied to a demultiplexer 104. Each of the sub-decoders 106 ... 114 is supplied with three output signals of the demultiplexer 104. A first one of these outputs is connected to a reference envelope generator 108. A second one of these outputs is connected to a first input of a multiplier circuit 110 and a third one of these outputs is connected to a first input of a multiplier circuit 112. Alternatively, however, it is conceivable that the third output of the multiplexer 104 is not available, but that the first input of the multiplier circuit 112 is connected to an output of a noise generator 109. An output of the reference envelope generator 108 is connected to a second input of the multiplier circuit 110. An output of the multiplier circuit 110 is connected to a second input of a multiplier circuit 112. The output of the multiplier circuit 112 forms one of the decoded sub-band signals. The sub-decoders 106 ... 114 are arranged in similar manner.

The envelope generator 108 generates the selected reference envelope in response to the received identification code. The multiplier circuit 110 multiplies the selected reference envelope by the power measure, so that a replica of the envelope of that particular sub-band signal is obtained. The replica of the envelope of the sub-band signal is multiplied in the multiplier circuit 112 by the received sign of the sub-band signal samples, so that on the output of the multiplier circuit 112 the reconstructed signal is available in the form of a sub-band signal. For sub-bands for which the sign of the samples of the sub-band signal is not transmitted, the output signal of the multiplier circuit 110 is multiplied by the output signal of the noise source 109 by the multiplier circuit 112.

Figure 5:
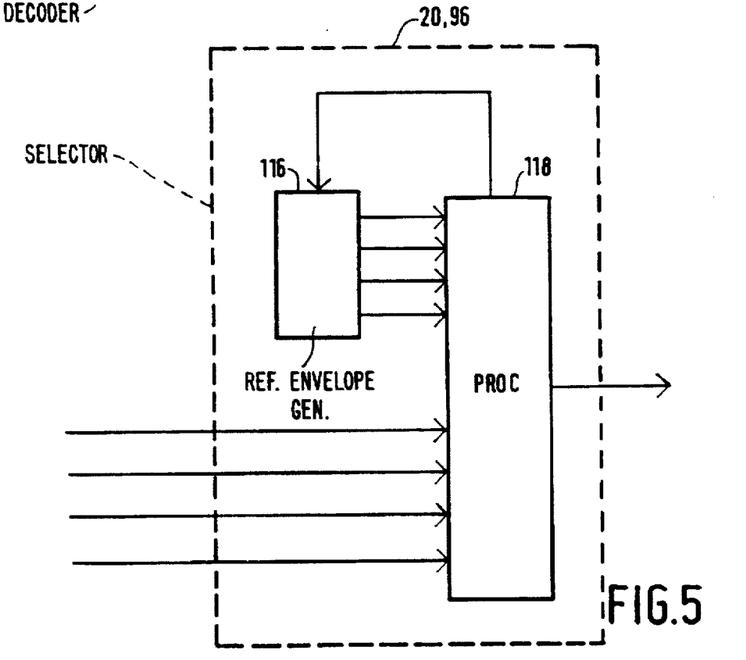
FIG. 5 shows a selecting means to be used in the transmission system shown in FIG. 1a and in the sub-band coder shown in FIG. 4.

The selecting means 20 in FIG. 1A and 96 in FIG. 3 is shown in detail in FIG. 5. Four inputs, carrying four absolute values of the scaled sub-band signal in a segment for the input signals, are connected to four inputs of a processor 118. In FIGS. 1A and these four inputs of the selecting means are symbolically represented by a single input. A first output of the processor 118, carrying an address signal for its output signal, is connected to an input of a ROM 116. Four outputs of the ROM 116, carrying four values representing the reference envelope for the output signals, are connected to four further inputs of the processor 118. A second output of the processor 118, carrying the identification code of the reference envelope for its output signal, forms the output of the selecting means 96.

It is assumed that in the selecting means 20, 96 shown in FIG. 5 the envelope of the output signal of the scaling means 94 in FIG. 3 is represented by four values of the reference envelope at successive instants. It is also assumed that the reference envelope is represented by such four values thereof. In the selecting means 20, 96 the processor successively generates addresses for the ROM 116. This ROM 116 delivers in the form of four values the reference envelope stored at the particular address. The processor 118 reads the values which represent the reference envelope and the envelope of the output signal of the scaling means 94. The processor 118 calculates a difference between the two envelopes which is, for example, equal to the sum of the squared difference between the corresponding values representing the envelopes. The processor successively generates the addresses of all the reference envelopes to be incorporated in the comparison, and places on the second output the identification code of that particular reference envelopes for which there is a minimum difference. It is noted that for the sub-bands in which the envelopes are represented by eight signal samples, the selecting means is to have eight inputs. The ROM 116 therefore has eight outputs, whilst the input ports of the processor 118 then also have to have eight inputs.

Figure 6:
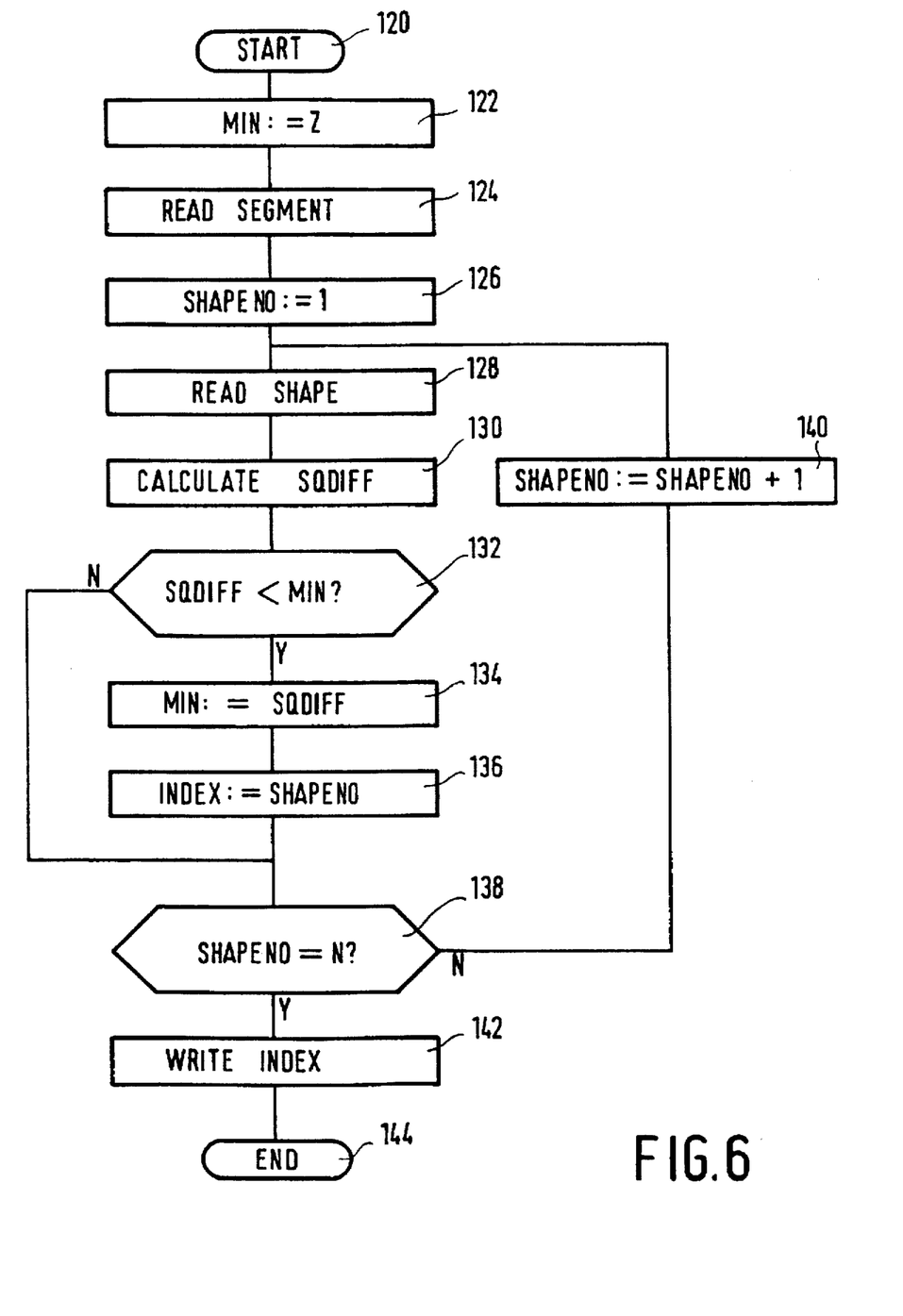
FIG. 6 shows a flow chart of a program for determining the optimum reference envelope for processor 118 in FIG. 5.
Figure 7A:
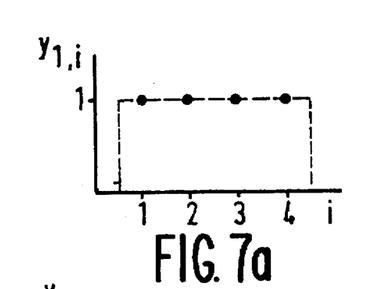
FIGS. 7a–7e are graphic representations of reference envelopes such as can be used in the coder and decoder shown in FIGS. 2 and 4, which envelopes are each represented by four values.
Figure 7B:
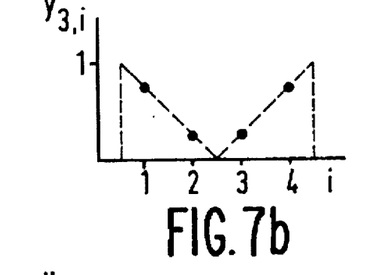
Figure 7C:
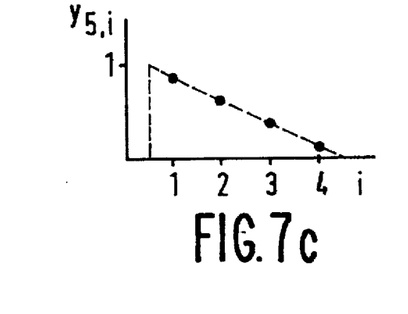
Figure 7D:
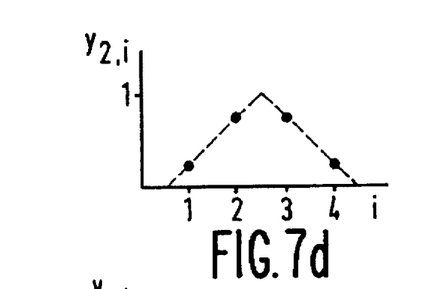
Figure 7E:
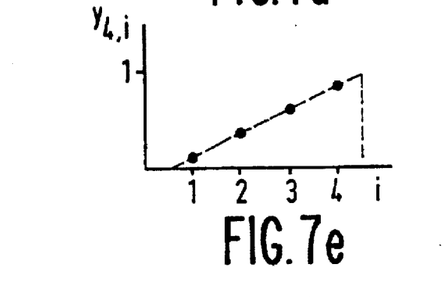
Figure 8A:
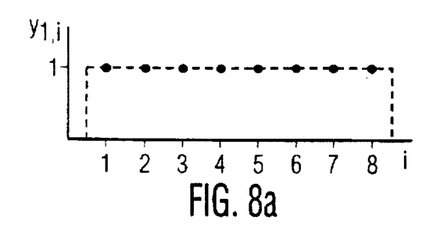
Figure 8B:
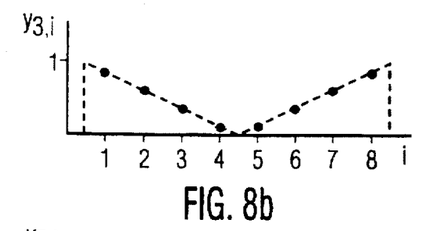
Figure 8C:
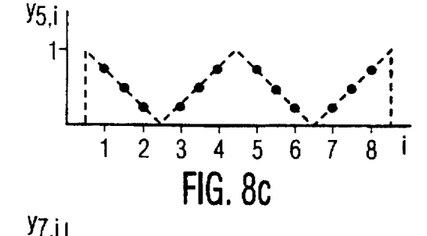
Figures 8D, 8E:
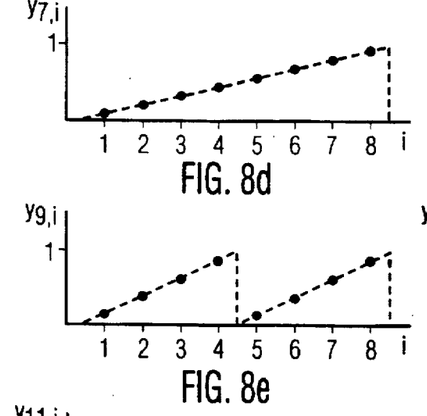
Figure 8F:
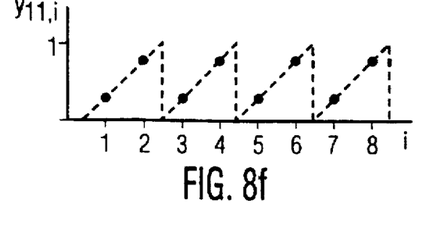
Figure 8G:
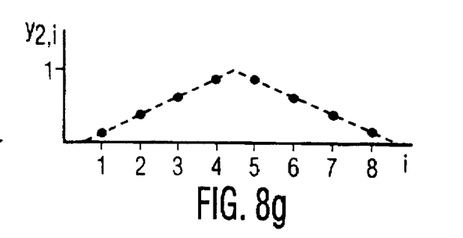
Figure 8H:
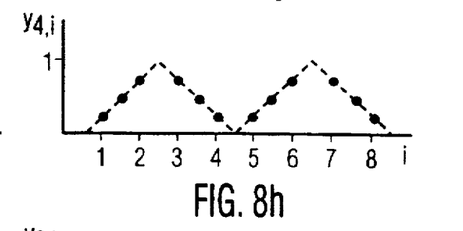
Figure 8J:
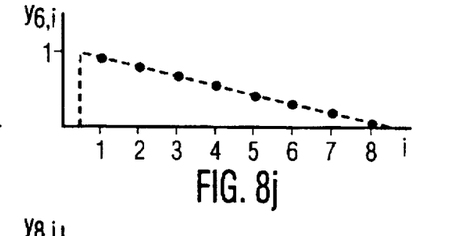
Figures 8K, 8M:
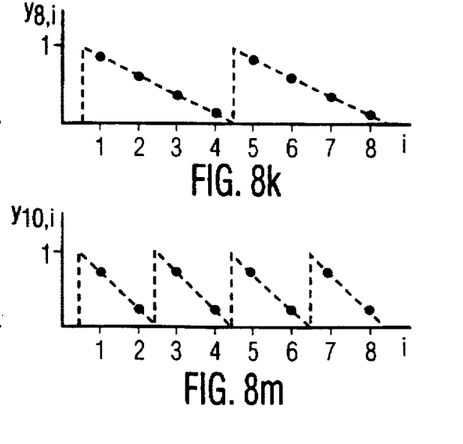

To carry out the above function, the processor 118 is to be loaded with a suitable program of which a flow chart is shown in FIG. 6. The numbered instructions have the connotations shown in the below Table.

| No. | Inscription | Connotation |
| --- | --- | --- |
| 120 | START | Start of the program. |
| 122 | MIN:=Z | The value of the variable MIN is made equal to a constant Z. |
| 124 | READ SEGMENT | The values representing the envelope of the segment are read. |
| 126 | SHAPENO:=1 | The first reference envelope is selected. |
| 128 | READ SHAPE | The values representing the reference envelope are read. |
| 130 | CALCULATE SQDIFF | The squared difference between the reference envelope and the envelope of the segment is calculated. |
| 132 | SQDIFF < MIN ? | A test is made whether SQDIFF is smaller than MIN. |
| 134 | MIN:=SQDIFF | The value of the variable MIN is made equal to the variable SQDIFF. |
| 136 | INDEX:=SHAPENO | The index of the optimum reference envelope so far is stored. |
| 138 | SHAPENO=N ? | A test is made whether all the reference envelopes have been compared with the envelope of a segment. |
| 140 | SHAPENO:=SHAPENO+1 | The next reference envelope is selected. |
| 142 | WRITE INDEX | The identification code of the selected reference envelope is placed on the second output of the processor. |

The program shown in the flow chart of FIG. 6 is carried out once for each segment of sub-band signal samples. In block 122 the variable MIN representing the minimum error measure is made equal to a number Z which is so large that the minimum difference is bound to be smaller than this number Z. Subsequently, in block 124, the values representing the envelope of a segment are read by the processor 118. In block 126 the address belonging to the first reference envelope is placed on the first output of the processor. In block 128 the values representing the reference envelope are read by the processor. In block 130 the difference between the envelope of the segment and the reference envelope is calculated. The difference SQDIFF may be calculated as follows:

$$SQDIFF = \sum_{i=1}^{L} (x_i - y_i)^2 \qquad (2)$$

In (2) i is a running variable, L is the number of values that represent the envelopes, $x_i$ is the $i^{th}$ value of the values representing the segment envelope and $y_i$ is the $i^{th}$ value of the values representing the reference envelope.

In block 132 the value SQDIFF is compared with the value MIN. If the value SQDIFF is smaller than the value MIN, the current reference envelope corresponds more to the envelope of the segment than the reference envelopes that have previously been compared with the segment envelope. In that case the value of MIN is made equal to the value SQDIFF in block 134. In addition, in block 136 the value INDEX, representing the identification code of the reference envelope corresponding most so far, is made equal to the identification code of the current reference envelope. If the value SQDIFF is not smaller than the value MIN, the blocks 134 and 136 are skipped.

In block 138 there is verified whether all the reference envelopes have already been compared with the envelope of the segment of sub-band signal samples. If they have, the variable INDEX representing the identification code of the reference envelope corresponding most to the envelope of the segment of the sub-band signal samples is placed on the second output of the processor. If not yet all the reference envelopes to be included in the comparison have been compared with the envelope of the segment of the sub-band signal samples, in block 140 the next reference envelope is selected and block 128 is returned to.

It is observed that the coder and decoder may be implemented fully in hardware, but it is alternatively possible that the coder and/or decoder are realised fully or in part in a signal processor. This processor is then controlled by suitable software.

FIG. 7 shows five reference envelopes used for the sub-bands represented by four values. The reference envelope is represented by the values $y_{k,i}$, where k is the serial number of the reference envelope and i a serial number of the particular value which jointly defines the reference envelope. Experiments have shown that not all the reference envelopes occur equally often. This may be utilized to reduce, for example by means of Huffmann coding, the necessary transmission capacity for transmitting the identification code of the reference envelope.

FIG. 8 shows eleven reference envelopes utilized for sub-bands which are represented by eleven values. Here too, experiments have shown that not all the reference envelopes occur equally often.

It is noted that it is possible to utilize adaptive reference envelopes in lieu of fixed reference envelopes, which adaptive reference envelopes are derived from the sub-band signal to be coded.

We claim:

1. A transmission system comprising a transmitter for deriving an encoded digital signal from a transmit signal and transmitting the encoded signal over a communication channel to a receiver which decodes the transmitted encoded signal to derive a reconstruction of the transmit signal; characterized in that:

said transmitter includes a coder which comprises
means for digitizing and segmenting the transmit signal to derive a segmented digital signal, each segment including a plurality of successive samples of the transmit signal;

transforming means for subtracting a predictable component of the segmented digital signal therefrom so as to transform said signal into a segmented residual signal, each segment of said residual signal having an envelope, said predictable component being described by prediction parameters;

means for selecting for each of said residual signal segments, based on comparison with a plurality of stored reference envelopes, a reference envelope which best matches the segment envelope and providing parameters descriptive of each of the selected reference envelopes; and multiplexing means for combining said prediction parameters and said reference envelope parameters to form said encoded digital signal for transmission to said receiver; and said receiver includes a decoder which comprises:

demultiplexing means for deriving from the encoded digital signal the prediction parameters and envelope parameters relating to each segment of the segmented residual signal;

reconstruction means responsive to said envelope parameters to derive a reconstructed segmented residual signal the segments of which have envelopes corresponding to the envelopes of the segments of the segmented residual signal derived by said transmitter;

inverse transforming means for combining the reconstructed segmented residual signal with said prediction parameters to derive a segmented digital signal corresponding thereto; and demultiplexing means for combining the segments of the derived segmented digital signal to convert it into an analog signal which is a reconstruction of said transmit signal.

2. A transmission system as claimed in claim 1, wherein:

the parameters relating to the selected reference envelope for each segment include a power value of said segment and the relative signs of all signal samples in said segment;

said coder further comprises power measuring means for detecting a power value of each segment and sign determining means for detecting the relative signs of all signal samples in each segment; and said reconstruction means in said decoder comprises means responsive to the power value parameter and the sample signs parameter of a segment to modify the reference envelope for said segment in accordance with said parameters.

3. A transmission system as claimed in claim 1, wherein said decoder further comprises a noise source for generating a noise signal which is utilized by said reconstruction means in place of signs of the signal samples included in each segment of the segmented residual signal derived by said transmitter.

4. A transmission system as claimed in claim 1, wherein the transforming means in said transmitter comprises sub-band filters for dividing the segmented digital signal into a plurality of frequency sub-bands and producing a segmented residual signal for each of said sub-bands; and the inverse transforming means in said receiver combines the segmented digital signals of all said frequency sub-bands to derive a combined segmented digital signal.

5. A transmitter comprising a coder for deriving a digitally coded signal from an analog transmit signal, characterized in that said coder comprises:

analog-to-digital converting means for digitizing and segmenting the transmit signal to derive a segmented digital signal;

envelope measuring means for measuring an envelope of each of the segments of the digital signal;

selecting means for comparing the measured envelope of each segment of the digital signal with a plurality of stored reference envelopes, and selecting a best matching reference envelope for each of said segments, each selected reference envelope having an identification code; and means for transmitting the identification codes of the selected reference envelopes for segments of the digital signal, which codes enable reconstruction therefrom of a replica of said segmented digital signal, the segments of said replica having envelopes corresponding to said reference envelopes.

6. A receiver comprising a decoder for reconstructing a segmented digital signal from a received series of identification codes identifying which of a plurality of reference envelopes most closely match the envelopes of the segments of said signal; comprising:

means for generating digital signal segments having envelopes corresponding to the reference envelopes signified by said identification codes; and means for combining the generated digital signal segments to form a substantially matching replica of said segmented digital signal therefrom, wherein said most closely matching reference envelop for a given segment has been selected from a plurality of stored reference envelops based on comparison with a measured envelop of said segment.

* * * * *